United States Patent
Warner

[19]

[11] Patent Number: 5,984,611
[45] Date of Patent: Nov. 16, 1999

[54] WHEEL DOLLY

[76] Inventor: Robert P. Warner, 11 Mark Cir., Vernon, Conn. 06066

[21] Appl. No.: 08/985,849

[22] Filed: Dec. 5, 1997

[51] Int. Cl.[6] .................................................. B60B 29/00
[52] U.S. Cl. .......................................... 414/430; 280/79.4
[58] Field of Search .................................... 414/426, 430, 414/911, 490, 444; 104/172.3, 166; 280/79.4

[56] References Cited

U.S. PATENT DOCUMENTS

| | | | |
|---|---|---|---|
| 2,246,882 | 9/1941 | Gentry | 414/426 |
| 2,503,138 | 4/1950 | Smith | 414/426 |
| 2,525,351 | 10/1950 | Hennings | 414/430 |
| 2,539,274 | 1/1951 | Sagen | 414/426 |
| 2,600,740 | 6/1952 | Drum | 414/430 |
| 2,600,742 | 6/1952 | Drum | 414/430 |
| 2,695,717 | 11/1954 | Crow | 414/426 |
| 3,939,999 | 2/1976 | Nielson | 414/444 |
| 4,389,943 | 6/1983 | Watatani | 104/166 |
| 4,895,319 | 1/1990 | Bardsen | 414/426 |
| 5,176,487 | 1/1993 | Flitton | 414/428 |
| 5,244,221 | 9/1993 | Ward | 280/47.35 |
| 5,294,145 | 3/1994 | Cheng | 414/490 |

*Primary Examiner*—Christopher P. Ellis
*Assistant Examiner*—Isobel A. Parker
*Attorney, Agent, or Firm*—Pepe & Hazard LLP

[57] ABSTRACT

A wheel dolly for moving truck tires and drums to and from a wheel on a truck has an elongated frame for disposition on a base surface oriented in substantial axial alignment with the wheel of a vehicle. The frame has a pair of elongated and parallel spaced cylindrical members formed of sections which have telescoping adjacent ends. End braces extend across and are secured to the opposite ends of the cylindrical members. A carrier is slidably seated on the cylindrical members for movement therealong, and it has a planar central portion and angular portions depending therefrom outwardly of the frame to provide ramp surfaces. The carrier also has rollers supported on the lower surface of the central portion which are configured to seat on the cylindrical members.

7 Claims, 2 Drawing Sheets

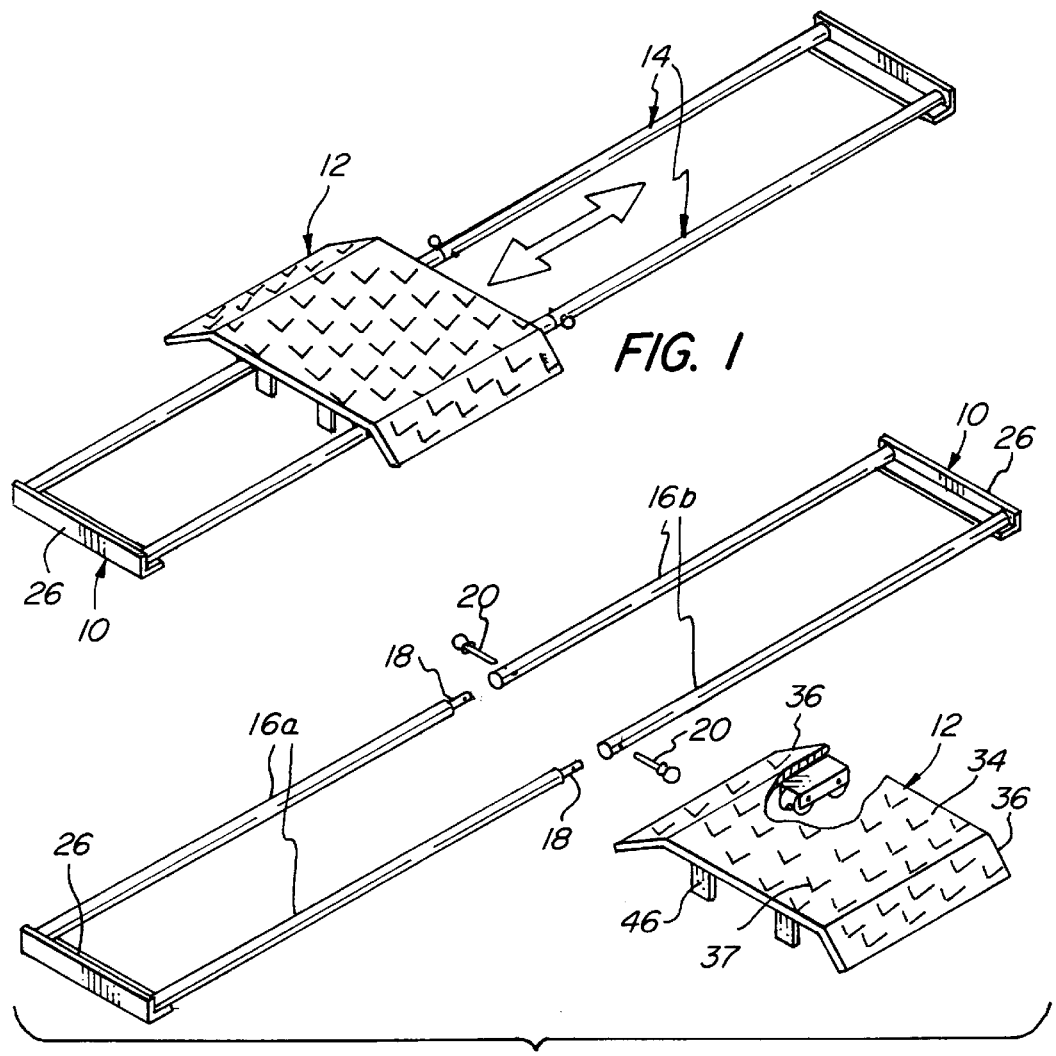
FIG. 1
FIG. 2
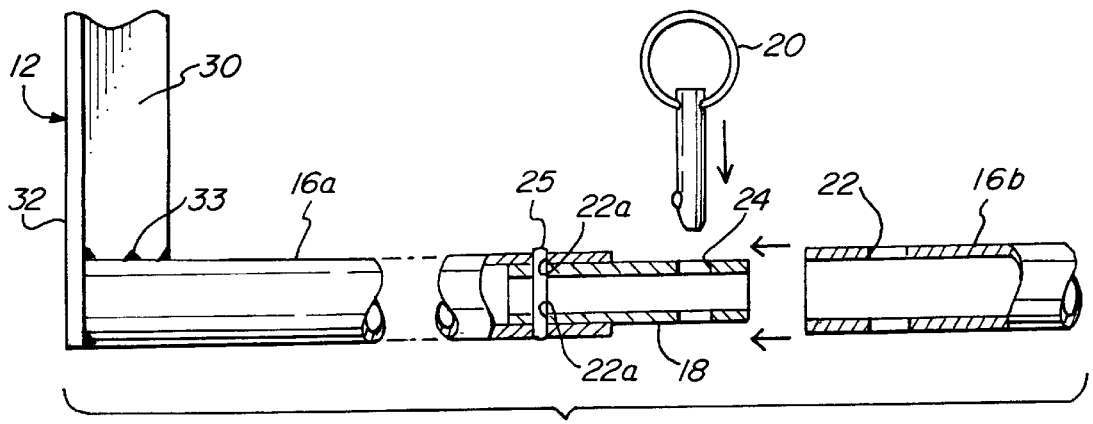
FIG. 3

WHEEL DOLLY

BACKGROUND OF THE INVENTION

The present invention relates to movable carriers for tires, and, more particularly, to a dolly for moving truck tires and drums relative to the wheel of a tractor or cab.

In order to effect repairs on brakes of a truck or to perform other repairs involving the wheels of the truck, it is necessary to remove the tires and drums which are both heavy and cumbersome. The problem is particularly acute in the instance of double tires which are utilized in large trailers for carrying substantial loads.

A number of handling devices have been proposed to facilitate the movement of the tires inwardly and outwardly of the wheel, namely those shown in Gentry Pat. No. 2,246,882, Hennings et al Pat. No. 2,525,351, Sagen Pat. No. 2,539,274 and Crow Pat. No. 2,659,717. These devices are generally heavy and cumbersome and do not readily lend themselves to use in the field. Some do not readily lend themselves to placement on uneven surfaces, and most are not conveniently transportable.

It is an object of the present invention to provide a novel wheel dolly for moving the tires and drums relative to the truck wheel.

It is also an object to provide such a wheel dolly which can be readily disassembled to facilitate storage for transport to a location where needed.

Another object is to provide such a wheel dolly which can be readily fabricated from easily available components to provide a long lived structure enabling facile movement of the truck tires inwardly and outwardly of the wheel.

SUMMARY OF THE INVENTION

It has now been found that the foregoing and related objects may be readily attained in a wheel dolly for moving truck tires and drums to and from a wheel on a truck which includes an elongated frame for disposition on a base surface oriented in substantial axial alignment with the wheel of a vehicle. The frame has a pair of elongated and parallel spaced cylindrical members each formed of a pair of sections which have telescoping adjacent ends, and end braces extending across and secured to the opposite ends of the cylindrical members. A carrier is slidably seated on the cylindrical members for movement therealong, and it has a planar central portion and angular portions depending therefrom outwardly of the frame to provide ramp surfaces. The carrier also has rollers supported on the lower surface of the central portion which are configured to seat on the cylindrical members.

Desirably, the frame includes releasable fasteners securing the telescoping ends of the cylindrical members in assembly, and the carrier has depending stops on each thereof to abut the end braces and limit movement of the carrier on the frame. The end braces are of generally L-shaped configuration with a horizontal leg upon which the ends of the cylindrical members are seated and a vertical leg which they abut.

The upper surface of the carrier has formations thereon to increase the frictional positioning of tires thereon, and the rollers are provided by cars secured to the carrier and each having a pair of spaced wheels with a concave circumferential surface configured to seat stably on the cylindrical members.

Preferably, a car is disposed adjacent each of the corners of the carrier.

BRIEF DESCRIPTION OF THE ATTACHED DRAWINGS

FIG. 1 is a perspective view of a tire dolly embodying the present invention;

FIG. 2 is a partially exploded view of the tire dolly of FIG. 1 with a portion of the carrier plate broken away to reveal the underlying car;

FIG. 3 is a fragmentary plan view of the frame drawn to an enlarged scale and in partial section with the assembling pin removed therefrom;

DETAILED DESCRIPTION OF THE PREFERRED EMBODIMENT

Figures 4, 5:
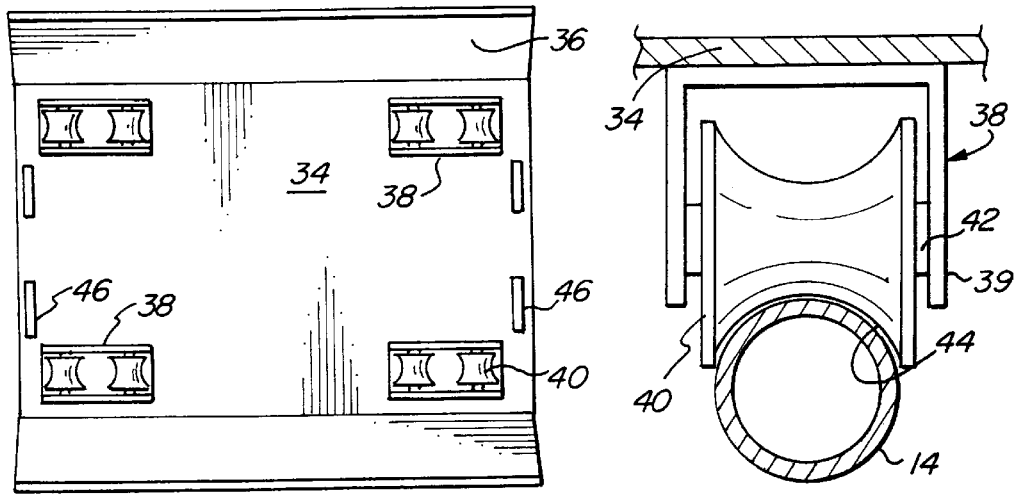
FIG. 4 is a bottom view of the carrier.
FIG. 5 is a fragmentary elevational view of a portion of the carrier showing a roller car seated on the cylindrical rail.

Turning first to FIG. 1, therein illustrated is a tire dolly embodying the present invention and having an elongated frame generally designated by the numeral 10. Slidably supported upon the frame 10 is a carrier generally designated by the numeral 12 and it is movable in either direction as illustrated by the double headed arrow.

As seen in FIGS. 2–5, the frame 10 is comprised of two elongated cylindrical rails 14, each comprised of a pair of telescoping sections 16a, 16b and a bridging core element 18. As can be seen, the sections 16b telescopically fit over the core elements or splice 18 and are secured in position thereon by the locking pins 20 which extend through aligned apertures 22 in the sections 16b and the core 18. The core element 18 is essentially permanently fixed in the end of the tubular sections 16a by the pins 20 similarly seated in apertures 22a. The frame 10 also includes the L-shaped braces 26 which are of L-shaped cross section and generally comprise relatively rugged angle irons. As can be seen, the rails 14 seat upon the horizontal leg 30 and abut the vertical leg 32 and are secured to the braces 26 by weldments 33 seen in FIG. 3.

Turning now in detail to the carrier 12, it is comprised of a rugged metal plate having a central portion 34 and depending ramp portions 36 on either side thereof. The surface is provided with a diamond pattern 37 which enhances the frictional positioning of the tires 48 thereon. On the bottom surface of the central portion 34 adjacent the four corners thereof are cars generally designated by the numeral 38 and which include frames 39 of inverted U-shaped configuration. Supported in the vertical legs of the frame 39 are shafts 42 which seat the rollers 40. As seen, the circumferential surface of the rollers 40 is configured to provide a concave recess 44 which cooperates with the convex circumference of the rails 14 as best seen in FIG. 5. Each of the cars 38 has a pair of such rollers 40 so that the carrier 12 will smoothly move along the upper surface of the rails 14 despite the heavy load thereon.

Depending from the central portion 34 of the carrier 12 are stops 46 which will abut the braces 26 to limit motion of the carrier 12 along the rails 14.

Figure 6:
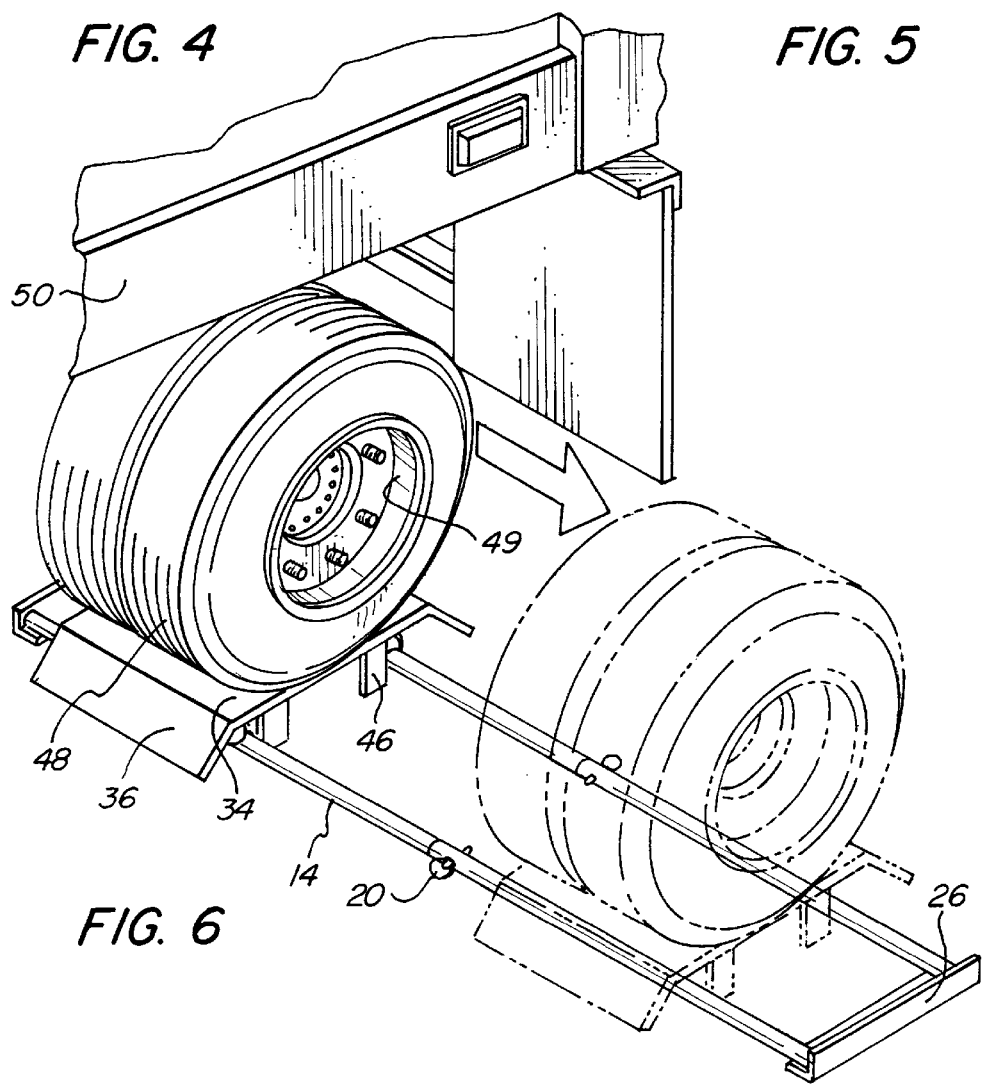
FIG. 6 is a fragmentary view of a trailer with the tire dolly initially oriented for movement of the truck tires and drum from the position shown in solid line to the position shown in phantom line so as to enable access to the wheel and the brake hardware.

As seen in FIG. 6, the dolly is oriented on a ground surface in a position perpendicular to the trailer 50 and in a position extending under the tires 48 and drum 49 to be removed. The carrier 12 is moved along the rails 14 into a position underlying the wheels and the tires 48 may then be pulled off the lugs of the wheel as the carrier 12 is slid along the rails 14 to a remote position well outwardly from the trailer so as to enable the mechanic to work upon the brake drum or wheel.

The cylindrical configuration of the rails enables the dolly to be positioned fairly stably on uneven surfaces with minimal levelling action. Moreover, the cylindrical surface provides a relatively high degree of strength for carrying the load. A highly satisfactory device has been produced utilizing Schedule 40 pipe having a ⅝ inch internal diameter and a ⅞ inch outer diameter. The splice for connecting the two sections of the rails is conveniently provided by a Schedule 40 pipe having inner and outer diameters respectively of 7/16 inch and ⅝ inch.

The carrier is conveniently made of steel plate having a thickness of ⅛ inch and provided with a diamond plate surface to provide stable positioning of the tires thereon and the ramp surfaces enable the trailer or truck to be backed or driven there onto.

By utilizing four cars each having a pair of rollers, excellent rolling support is provided for the carrier despite the rather substantial weight of the tires and drum which are being moved thereon.

From the standpoint of convenience, the relatively long frame of typically 56 inches can be disassembled into two 29 inch sections by removing the pins and disengaging the telescoping elements so that the unit is reduced to half its length. Moreover, the carrier can also be disassembled and stored separately. This enables a repair truck to conveniently carry one or more of the dollies for work in the field as well as convenient storage in a shop.

Thus, it can be seen from the foregoing detailed description and attached drawings that the wheel dolly of the present invention is relatively simple to fabricate, rugged in construction, and long lived. It is easily stored and carried to off site locations to perform emergency repairs on vehicles in the field. It may be stably seated on a ground surface and will permit facile sliding movement of the tires and drums inwardly and outwardly relative to the truck wheel.

Having thus described the invention, what is claimed is:

1. A wheel dolly for moving truck tires and drums to and from a wheel axle of a truck comprising:
   (a) an elongated frame for disposition on a base surface and oriented in substantial axial alignment with the wheel of the truck and having
      (i) a pair of elongated and parallel spaced cylindrical members each formed of a pair of sections which have telescoping adjacent ends;
      (ii) end braces extending across and secured to the opposite ends of said cylindrical members;
      (iii) releasable fasteners securing said telescoping ends of said cylindrical members in assembly; and
   (b) a carrier slidably seated on said cylindrical members for movement therealong, said carrier having a planar central portion and angular portions depending therefrom outwardly of said frame to provide ramp surfaces, said carrier also having rollers supported on the lower surface of said central portion and configured to seat on said cylindrical members, said rollers being provided by a multiplicity of cars secured to said central portion of said carrier, each of said cars having a pair of spaced wheels with a concave circumferential surface configured to seat stably on said cylindrical members.

2. The wheel dolly in accordance with claim 1 wherein said carrier has depending stops on each end thereof to abut said end braces and limit movement of said carrier on said frame.

3. The wheel dolly in accordance with claim 1 wherein the upper surface of said carrier has formations thereon to increase the frictional positioning of tires thereon.

4. The wheel dolly in accordance with claim 1 wherein said cars are disposed adjacent each of the corners of said carrier.

5. The wheel dolly in accordance with claim 1 wherein said end braces are of generally L-shaped configuration with a horizontal leg upon which the ends of said cylindrical members are seated and a vertical leg which they abut.

6. A wheel dolly for moving truck tires and drums to and from a wheel axle of a truck comprising:
   (a) an elongated frame for disposition on a base surface and oriented in substantial axial alignment with the wheel of the truck and having
      (i) a pair of elongated and parallel spaced cylindrical members each formed of a pair of sections which have telescoping adjacent ends and releasable fasteners securing said telescoping ends in assembly;
      (ii) end braces extending across and secured to the opposite ends of said cylindrical members said end braces being of generally L-shaped configuration with a horizontal leg upon which the ends of said cylindrical members are seated and a vertical leg which they abut; and
   (b) a carrier slidably seated on said cylindrical members for movement therealong, said carrier having a planar central portion and angular portions depending therefrom outwardly of said frame to provide ramp surfaces, said carrier also having rollers supported on the lower surface of said central portion and configured to seat on said cylindrical members, said rollers being provided by a multiplicity of cars secured to said central portion of said carrier, each of said cars having a pair of spaced wheels with a concave circumferential surface configured to seat stably on said cylindrical members, said cars being disposed adjacent each of the corners of said central portion of said carrier.

7. The wheel dolly in accordance with claim 6 wherein said carrier having depending stops on each end thereof to abut said end braces and limit movement of said carrier on said frame, and the upper surface of said carrier having formations thereon to increase the frictional positioning of tires thereon.

* * * * *